United States Patent [19]
Leonard et al.

[11] Patent Number: 5,903,874
[45] Date of Patent: May 11, 1999

[54] SYSTEM AND METHOD FOR ELECTRONIC COUPON MANAGEMENT

[75] Inventors: Timothy Mark Leonard, Coralville; Gregory Lee Mumford, Marion, both of Iowa

[73] Assignee: MCI Communications Corporation, Washington, D.C.

[21] Appl. No.: 08/671,188

[22] Filed: Jun. 27, 1996

[51] Int. Cl.[6] .................................................. G06F 151/00
[52] U.S. Cl. ................................................. 705/14; 705/23
[58] Field of Search .................................. 705/14, 1, 23, 705/16; 379/144; 235/380

[56] References Cited

U.S. PATENT DOCUMENTS

| | | | |
|---|---|---|---|
| 4,975,942 | 12/1990 | Zebryk | 379/144 |
| 5,053,955 | 10/1991 | Peach et al. | 364/401 |
| 5,163,086 | 11/1992 | Ahearn et al. | 379/91 |
| 5,185,695 | 2/1993 | Pruchnicki | 364/401 |
| 5,208,445 | 5/1993 | Nahar et al. | 235/375 |
| 5,287,181 | 2/1994 | Holman | 348/473 |
| 5,317,135 | 5/1994 | Finocchio | 235/375 |
| 5,450,477 | 9/1995 | Amarant et al. | 379/93 |
| 5,502,636 | 3/1996 | Clarke | 364/401 |
| 5,621,787 | 4/1997 | Mckoy et al. | 379/144 |
| 5,649,114 | 7/1997 | Deaton et al. | 395/214 |
| 5,677,945 | 10/1997 | Mullins et al. | 379/91 |
| 5,692,182 | 11/1997 | Desai et al. | 395/610 |
| 5,708,422 | 1/1998 | Blonder et al. | 340/825 |

*Primary Examiner*—Allen R. MacDonald
*Assistant Examiner*—Romain Jeanty

[57] ABSTRACT

A system and method for managing and redeeming a promotional coupon for goods and services. The system provides a link between an operator console and a remote database server having one or more coupon files, each of which contains a plurality of coupon records. A customer telephones the operator and discloses an encrypted coupon number from the coupon issued to the customer. The encrypted coupon number is used to access the relevant coupon record in a coupon file on the remote database server. The status of the coupon is transmitted back to the operator console. If the coupon is valid, the operator console provides the goods or services requested by the customer. The operator console subsequently sends a command to the coupon file to change the status of the coupon in the coupon record.

16 Claims, 12 Drawing Sheets

SYSTEM AND METHOD FOR ELECTRONIC COUPON MANAGEMENT

BACKGROUND OF THE INVENTION

1. Field of the Invention

The present invention relates to the field of electronic management of promotional coupons, and more particularly, to the real-time redemption of promotional coupons for goods and services, such as telecommunications and rebates, where the customer with the printed coupon is remotely located from the redemption agent.

2. Related Art

Companies issue promotional coupons for a variety of purposes, such as to encourage new customers to try the goods or services of the company, or to provide a simple accounting system whereby customers may give gifts of the goods or services to others. Coupons can also be used for controlling the redemption of rebates, registering a newly purchased product, receiving free time with a long distance telecommunications carrier, and enforcing trial periods or a free number of telephone calls with a telecommunications carrier. The coupons are usually printed objects, carrying printed indicia or a coupon number to prevent forgery. When the coupons are used in-person at a retail store, a store clerk may examine the coupon to verify by the printed indicia whether or not the coupon is valid. Upon successful verification, the store clerk provides the goods or services to the customer, and then collects the coupon to remove it from circulation (and from possible re-use). The coupon may also be sent to a central location for tabulation.

In the field of telecommunications, such as long distance telephony, it is also desirable to issue coupons to encourage new customers to the long-distance service or to enable giving of gifts of the service. However, unlike the situation in a retail store, a telecommunications operator processing the coupon, such as an operator in a long-distance network, is remotely located from the customer and from the printed coupon. Therefore, the operator cannot examine the printed coupon to verify its authenticity, and cannot collect the coupon after its use to remove it from circulation or to send it to a central tabulation facility. This remote use of coupons is further compounded by the fact that there are a variety of coupons, each having a variety of promotional characteristics, such as expiration date, type of service or goods, number of times the coupon can be used, day and time restrictions, and the use of cryptographic information to eliminate the possibility of forgery.

Therefore, there is a need for an electronic coupon management system wherein a database containing information for valid coupons communicates with a plurality of remote terminals, enabling telecommunications operators to verify or validate a coupon in real-time.

SUMMARY OF THE INVENTION

The present invention establishes a central coupon management facility containing a database of all issued coupons and their promotional characteristics. Each coupon in the database has a unique coupon number that is cryptographically transformed when released to a customer. A plurality of operator consoles are linked to the coupon management facility and can request verification, validation and other processing of the coupons.

In operation, a customer communicates with an operator located at one of the operator consoles, and reads the cryptographic coupon number on an issued coupon to the operator. The operator uses the operator console to communicate the coupon information to the coupon management facility. A message is returned to the operator indicating the status of the coupon. If the coupon is Available, the database entry is automatically locked. Therefore, any further requests to access the coupon while the lock is active will be unsuccessful. This locking feature prevents fraudulent uses of the coupon.

Upon receiving a coupon status of Available, the operator provides the user with the goods or services authorized via the coupon. If the coupon only authorizes a single use, the coupon status is changed to Used. However, if the coupon authorizes multiple uses, the number of available uses is updated, and the coupon status is changed back to Available.

The present invention provides for the remote verification and validation of a coupon while accommodating multiple uses of the coupon and time delays during utilization of the goods or services. More specifically, the present invention enables operators to electronically verify and validate a coupon in real-time while a customer is on-line waiting to use the authorized goods or services.

DETAILED DESCRIPTION OF THE PREFERRED EMBODIMENTS

1. Overview of an Electronic Coupon Management System

Figure 1:
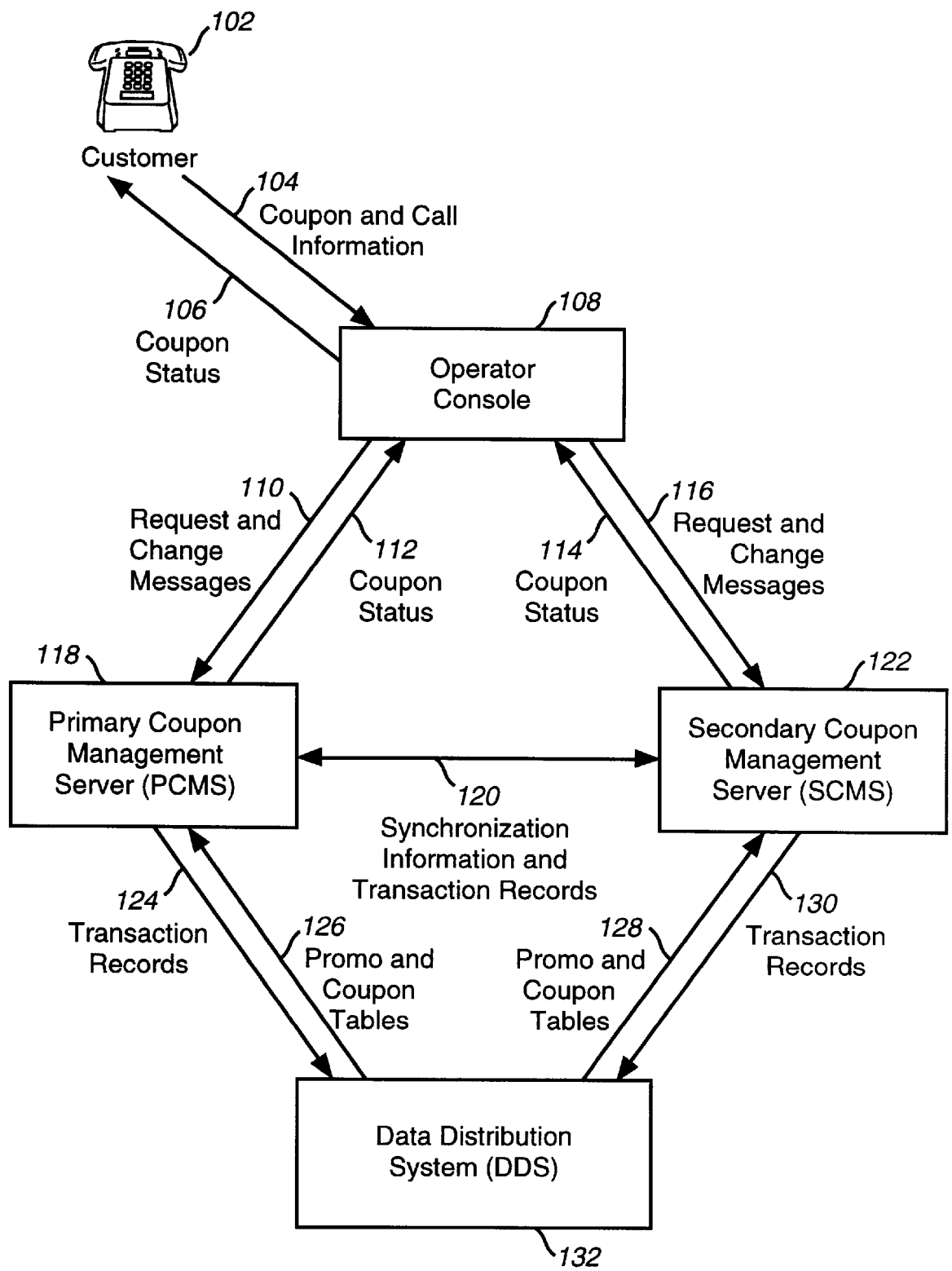
FIG. 1 is block diagram illustrating data flow within the preferred embodiment of the present invention.

FIG. 1 is a block diagram illustrating the data flow of a preferred embodiment of an electronic coupon management system of the present invention. A data flow diagram represents how data is transmitted between the components of a computer software application. Therefore, FIG. 1 illustrates the top level components of the present invention and the data flow between the components. The preferred embodiment is described in terms of long distance telephony for convenience purpose only. It would be readily apparent to one skilled in the art to apply the present invention to alternate goods and services.

The preferred embodiment of an electronic coupon management system comprises an operator console 108, a primary coupon management server (PCMS) 118, a secondary coupon management server (SCMS) 122, and a data distribution system (DDS) 132. The operator console 108 is a dedicated computer that provides an operator with an interface to a coupon management server. It should be understood that the preferred embodiment is described in terms of one operator console 108 for convenience purpose only. In actuality, however, multiple operator consoles 108 are desirable. The PCMS 11 8 and the SCMS 122 are dedicated coupon database servers that contain the current status on all promotional and coupon information. The DDS 132 is responsible for updating the PCMS 118 and the SCMS 122 with new promotional and coupon information, as well as for maintaining a log of all coupon transactions.

The operator console 108 is linked to the PCMS 118 and the SCMS 122 via a local area network (LAN). In operation, a telephone operator receives a telephone call from a customer 102. The customer 102 provides the operator with coupon and call information 104. The operator console 108 determines whether to access the PCMS 118 or the SCMS 122. More specifically, the operator console 108 includes a resident network information distributed services (NIDS) configuration table that indicates to the operator console 108 which server to access as primary and secondary servers. The operator console 108 then connects to the selected server, either the PCMS 118 or the SCMS 122, and issues a request or change message 110, 116. A request message inquires into the current status of a coupon, whereas a change message changes a coupon's status to account for the customer 102 using the coupon. After processing the operator's message, the server returns the coupon's current status 112, 114. The operator then returns the coupon status 106 to the customer 102.

The PCMS 118 and the SCMS 122 (servers) are linked together to ensure that both servers contain up-to-date coupon information. The PCMS 118 and the SCMS 122 exchange synchronization information and transaction records 120. Therefore, regardless of whether the operator console 108 connects to the PCMS 118 or the SCMS 122, the operator receives the most current coupon information and status.

The PCMS 118 and the SCMS 122 are both connected to the DDS 132. The servers send transaction records 124, 130 to the DDS 132, thereby enabling the DDS 132 to maintain a log of all coupon transactions. The log is used as an audit trail to track customer activity and coupon usage. In addition, the DDS 132 downloads to the PCMS 118 and the SCMS 122 new promo and coupon tables 126, 128 as the coupons are issued and become available. It should be understood that the preferred embodiment of downloading the coupon tables to the PCMS 118 and the SCMS 122 includes the use of multiple pipes such that the coupon tables are downloaded in parallel data streams. FIG. 1 shows a single data flow for the promo and coupon tables 126, 128 for convenience purposes only. It would be readily apparent to one skilled in the art to download the promo and coupon tables 126, 128 in comparable ways.

Figure 2:
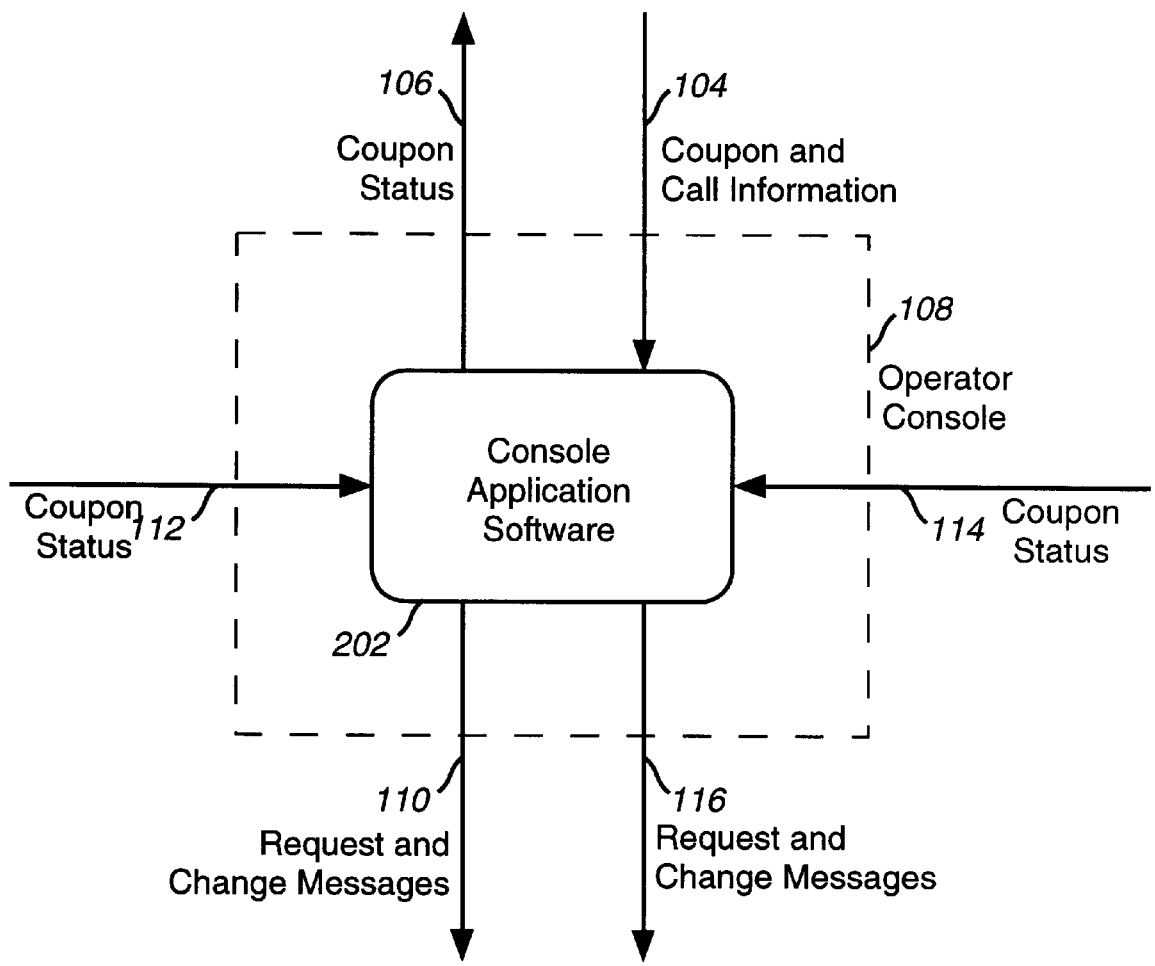
FIG. 2 is a block diagram illustrating the data flow of the components contained within an operator console.

FIG. 2 is a low level data flow diagram illustrating the internal component of an operator console 108. An operator console 108 includes console application software 202 that acts as an interface between the operator console 108 and a server. Upon receiving coupon and call information 104 from the customer 102, an operator directs the console application software 202 to establish a connection with either the PCMS 118 or the SCMS 122 server. Depending on the need, the operator console 108 then accesses the console application software 202 to send either a request or change message 110, 116 to the selected server. The console application software 202 receives the coupon status 112, 114 from the selected server and passes the coupon status 112, 114 back to the operator console 108. The coupon status 112, 114 includes additional information pertaining to the promotion. The operator then conveys the coupon status 106 to the customer 102. The control flow representing the actions of an operator console 108 and the console application software 202 are described in greater detail below.

Figure 3:
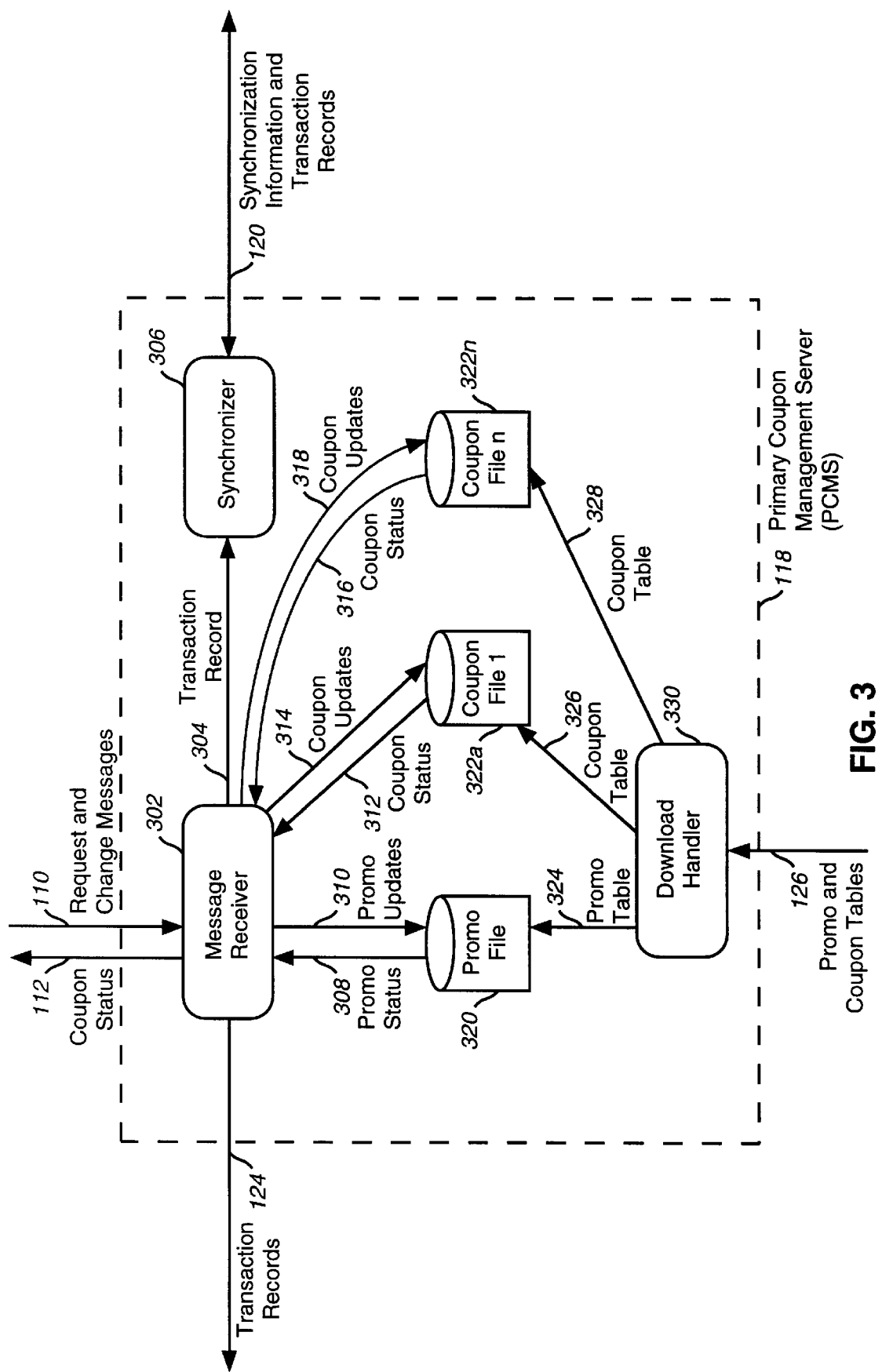
FIG. 3 is a block diagram illustrating the data flow of the components contained within a primary coupon management server.

FIG. 3 is a low level data flow diagram illustrating the internal components of a PCMS 118. The PCMS includes a message receiver 302, a synchronizer 306, a promo file 320, one or more coupon files 322a–322n, and a download handler 330. The promo file 320 is a database file that contains promotional records describing each of the types of promotional coupons handled by the electronic coupon management system. More specifically, a promotional record contains the promotional characteristics of a type of issued coupon. A sample promotional record is shown in Table 1:

TABLE 1

| Type | Field Name | Field Description |
| --- | --- | --- |
| LONG | StartDate | Stores the starting date and time that the coupon is available for use.<br>Type: Timestamp<br>Length: N/A<br>Key field: No<br>Format: GMT |
| LONG | EndDate | Stores the ending date and time that the coupon is available for use. The ending date is the expiration date plus the grace period.<br>Type: Timestamp<br>Length: N/A<br>Key field: No<br>Format: GMT |
| LONG | PubExpDate | Lists the expiration date printed on the coupons.<br>Timestamp<br>Length: 26 chars<br>Key field: No<br>Format: yyyy-mm-dd-hh.mm.ss.nnnnnn |
| CHAR | PromoCode | Stores the promotional code that is populated into the billing record and is imbedded into the coupon number.<br>Type: Numeric<br>Length: 5<br>Key field: No<br>Range: 0–99,999 |
| CHAR | BatchNum[8] | Stores the batch number of each specific group of coupons printed. This field allows for each individual coupon promotion to be tracked and monitored.<br>Type: Numeric (left justified)<br>Length: 7<br>Key field: No<br>Range: 0–9,999,999 |
| CHAR | CompletionType | Indicates what type of call completion the operator console application is to perform. Normal completion is the operator conference call completion to ensure a successful call, while special completions include transfers to a vendor for a call of controlled length.<br>Type: Numeric<br>Length: 2<br>Key field: No<br>Range: 0–99<br>Definition:<br>0 = Normal Domestic Only |

TABLE 1-continued

| Type | Field Name | Field Description |
|---|---|---|
| | | 1 = Normal International Only |
| | | 2 = Normal Domestic or International |
| | | 3 = Domestic 50 States Only |
| | | 4 = Transfer to Vendor |
| | | 5 = Advant DA Leg |
| | | 6 = Advant Call Completion Leg |
| CHAR | CoupAccessMth | Indicates what access method the coupons should be allowed for. Prevents coupons issued for 1-800 Collect to be used on the World Phone/Call USA access. The access method is the same as the call process number the card is issued for.<br>Type: Numeric<br>Length: 2<br>Key field: No<br>Range: 0–99<br>Definition:<br>0 = Generic O.S.<br>9 = *Card<br>43 = Call USA<br>46 = 1-800 Collect<br>50 = Advant<br>80-98 = Reserved<br>99 = All Accesses |
| CHAR | ProdType[4] | Indicates what billing method the coupons should be allowed for. Prevents coupons issued for 1-800 Collect to be used for World Phone/Call USA access. The coupon product type is the same as the billing type the coupon is intended for.<br>Type: Numeric (left justified)<br>Length: 3<br>Key field: No<br>Range: 0–999<br>Definition:<br>0 = All bill types for the<br>1–999 = Reserved |
| CHAR | ScriptType1[40] | Controls the scripting that is presented to the operator in the coupon collection window. Allows the operator to identify the coupon promotion amount and brief specific information about the program.<br>Type: Alpha/Numeric<br>Length: 40<br>Key field: No |
| CHAR | ScriptType2[40] | Controls the scripting that is presented to the operator in the coupon collection window. Allows the operator to identify the coupon promotion amount and brief specific information about the program.<br>Type: Alpha/Numeric<br>Length: 40<br>Key field: No |
| CHAR | TimeofDay | Controls the availability of the coupon to be used on a time of day basis, such that a coupon could only be redeemed during off peak hours such as 11 pm to 8 am.<br>Type: Bit Flag<br>Length: 48 bits (1 per half hour)<br>Key field: No<br>Definition:<br>each bit 0 = block or aglow |
| CHAR | DayOfWeek | Controls the availability of the coupon to be used on a day of week basis, such that a coupon could only be redeemed during off peak hours such as weekends.<br>Type: Bit Flag<br>Length: 8 bits (1 per day of week)<br>Key field: No<br>Definition:<br>each bit 0 = block or aglow |
| CHAR | Intervoice[5] | Contains the intervoice script offset number that stores the promotional announcement played to the customer with automation.<br>Type: Numeric<br>Length: 5 |

TABLE 1-continued

| Type | Field Name | Field Description |
|---|---|---|
| | | Key field: No<br>Range: 0–99,999 |
| CHAR | Reserved[16] | Reserved for future use. |

It should be understood that the sample promotional record comprises a complete record format. It would be apparent to one skilled in the relevant art to develop alternative embodiments for a promotional record comprising a different number of fields and different field definitions.

Coupon files 322a–322n are database files that contain coupon records describing the individual coupons issued for each type of promotion. A sample coupon record is shown in Table 2:

TABLE 2

| Type | Field Name | Field Description |
|---|---|---|
| CHAR | CouponNumber[25] | Actual number of a coupon. The coupon promotional code is imbedded into the coupon number.<br>Type: Alpha/Numeric<br>Length: 24 digits<br>Key field: Yes<br>Format<br>xxxxxxxxxxxxxxxxxxxxxxxx |
| CHAR | CouponStatus | The state of the coupon.<br>Type: Numeric<br>Length: 3 digits<br>Key field: No<br>Range: 0–255<br>Definitions:<br>1 = Available<br>2 = Read Lock<br>3 = Used<br>4–255 = Reserved |
| LONG | TimeStamp | The time that the record was last updated. Has three functions:<br>1. Designates time the coupon was last loaded into database or was returned to 'Available' status;<br>2. Used to determine if a coupon is stranded in 'Read-Lock' status and should be updated to 'Available;' and<br>3. Documents the date/time coupon was used.<br>Type: TimeStamp<br>Length: N/A<br>Key field: No<br>Format: GMT |
| USHORT | UsageCounter | The number of times a coupon may be used.<br>Type: Numeric<br>Length: 7<br>Key field: No<br>Range: 0–9,999,999 |
| USHORT | InitialCounter | The number of times a coupon may be used.<br>Type: Numeric<br>Length: 7<br>Key field: No<br>Range : 0–9,999,999 |
| USHORT | DecrementAmnt | Reserved for future use. |

It should be understood that the sample coupon record comprises a complete record format. It would be apparent to one skilled in the relevant art to develop alternative embodiments for a coupon record comprising a different number of fields and different field definitions.

The message receiver 302 provides an interface between the PCMS 118 and an operator console 108. It receives and processes the request and change messages 110 from an operator console 108. The message receiver 302 accesses the coupon files 322a–322n to retrieve the current coupon status 312, 316 associated with a specific coupon. To process the messages, the message receiver 302 accesses the promo file 320 to retrieve the promo status 308 associated with a specific coupon. If the operator console 108 sends a change message 110 to the PCMS 118, the message receiver 302 sends coupon updates 314, 318 to the coupon files 322a–322n. After the message receiver 302 processes the request and change messages 110, it returns the coupon status 112 back to the operator at the operator console 108. In addition, the message receiver 302 forwards the operator messages to the synchronizer 306 as a transaction record 304, and to the DDS 132 as a transaction record 124. The synchronizer 306 and DDS 132 are described in greater detail below.

The synchronizer 306 manages all communication between the PCMS 118 and the SCMS 122. In particular, the synchronizer 306 located on the PCMS 118 receives transaction records 304 from the console application software 302 and transmits synchronization information and transaction records 120 to the SCMS 122. This interface ensures that both the PCMS 118 and the SCMS 122 are synchronized and maintain the same data in their respective promo and coupon databases. Therefore, operators will always receive current promotional and coupon information and status regardless of which server, the PCMS 118 or the SCMS 122, they connect to.

The download handler 330 receives new promo and coupon tables 126 from the DDS 132 and updates the promo file 320 and the coupon files 322a–322n located on the PCMS 118. More specifically, the download handler 330 updates the promo file 320 with the new promo table 324 and updates the coupon files 322a–322n with the new coupon tables 326, 328. The DDS 132 sends promo and coupon tables 126 that reflect new promotions and newly issued coupons.

Figure 4:
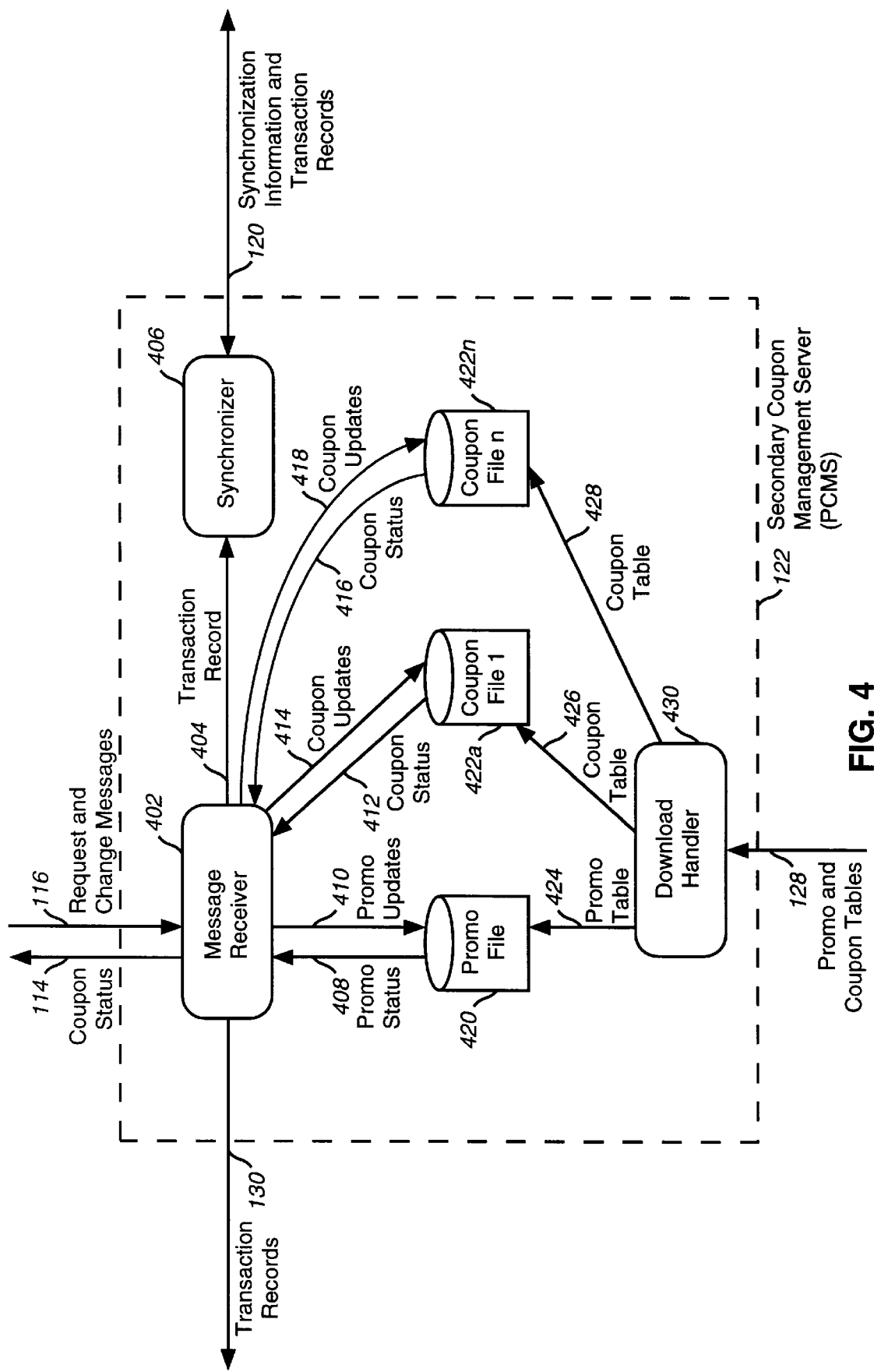
FIG. 4 is a block diagram illustrating the data flow of the components contained within a secondary coupon management server.

FIG. 4 is a low level data flow diagram illustrating the internal components of a SCMS 122. The SCMS 122 is identical in structure and operation to the PCMS 118. More specifically, the PCMS 118 components comprising the message receiver 302, synchronizer 306, promo file 320, one or more coupon files 322a–322n, and download handler 330 correspond directly to the SCMS 122 components comprising a message receiver 402, synchronizer 406, promo file 420, one or more coupon files 422a–422n, and download handler 430. It should be noted that the SCMS 122 synchronizer 406 transmits synchronization information and transaction records 120 from the SCMS 122 to the PCMS 118, thereby ensuring that the PCMS 118 keeps up with the coupon transactions occurring on the SCMS 122 and maintains current coupon information in its databases.

Figure 5:
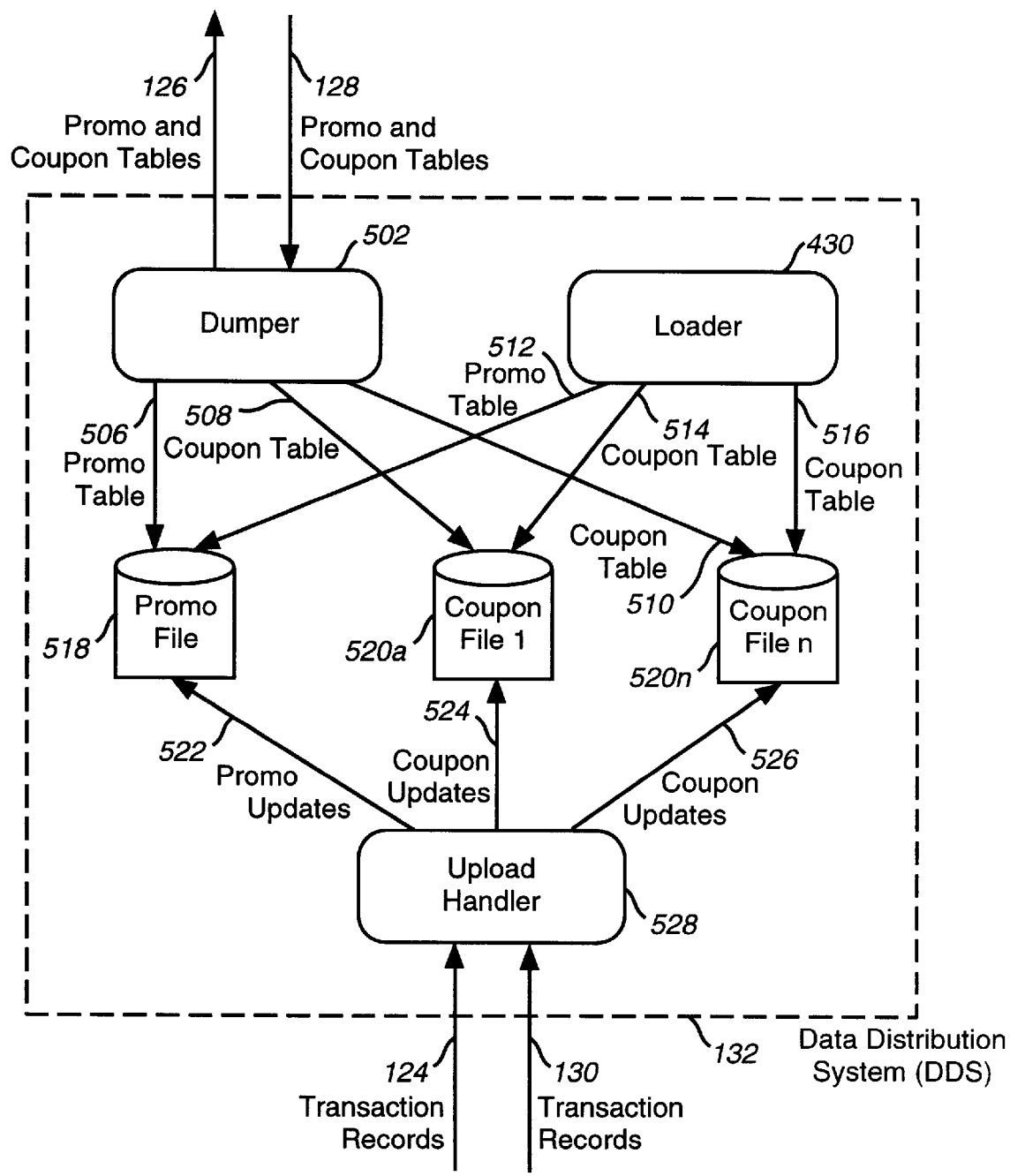
FIG. 5 is a block diagram illustrating the data flow of the components contained within a data distribution system.

FIG. 5 is a low level data flow diagram illustrating the internal components of a DDS 132. The DDS 132 includes a dumper 502, a loader 504, a promo file 518, one or more coupon files 520a–520n, and an upload handler 528. The promo file 518 and the coupon files 520a–520n located on the DDS 132 are identical in structure and operation as the PCMS 118 and the SCMS 122 promo files 320, 420 and coupon files 322a–322n, 422a–422n.

The dumper 502 downloads the promo file 518 and the coupon files 520a–520n to the servers. More specifically, the dumper 502 downloads the promo and coupon tables 126 to the PCMS 118, and the promo and coupon tables 128 to the SCMS 122. This process ensures that the servers have current information regarding new promotions and newly issued coupons.

The loader 504 is responsible for uploading new promo tables 512 to the promo file 518 and new coupon tables 514, 516 to the coupon files 520a–520n. This process ensures that the DDS 132 has the current information regarding new promotions and newly issued coupons to send to the PCMS 118 and the SCMS 122.

The upload handler 528 receives transaction records 124, 130 from the PCMS 118 and the SCMS 122 respectively. Based on the transaction records 124, 130, the upload handler sends promo updates 522 to the promo file 518 and coupon updates 524, 526 to the coupon files 520a–520n. This process allows the DDS 132 to maintain the current status of all promotions and issued coupons. In addition, by recording the coupon transactions that occur on the PCMS 118 and the SCMS 122, the DDS 132 can track coupon usage and provide an audit trail.

2. Host System

Figure 6:
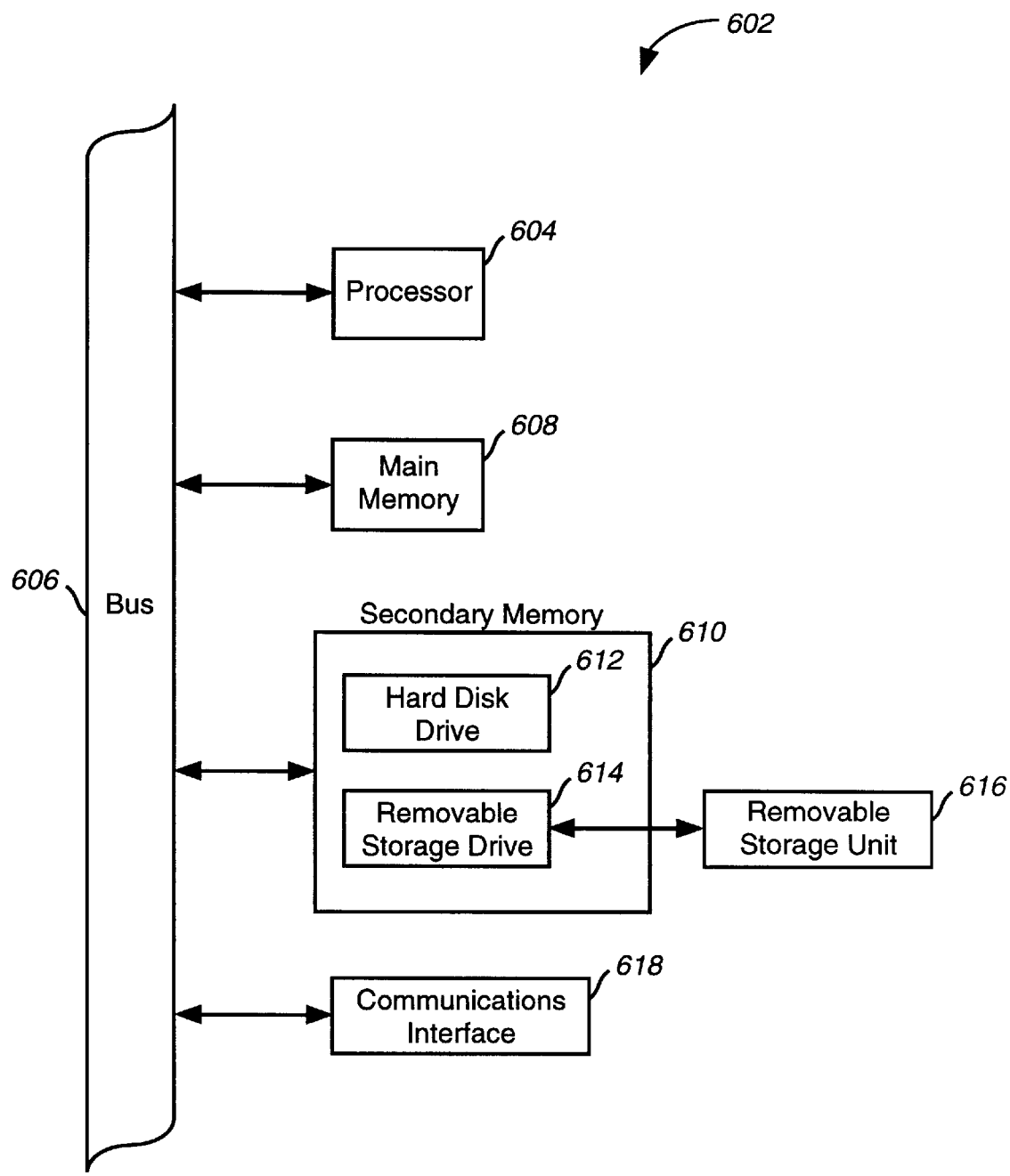
FIG. 6 is a block diagram illustrating an exemplary computer system for executing the preferred embodiment of the present invention.

The chosen embodiment of the present invention is computer software executing within a computer system. FIG. 6 shows an exemplary computer system. The computer system 602 includes one or more processors 604. The processor 604 is connected to a communication bus 606. The computer system 602 also includes a main memory 608, preferably random access memory (RAM), and a secondary memory 610. The secondary memory 610 includes, for example, a hard disk drive 612 and/or a removable storage drive 614, representing a floppy disk drive, a magnetic tape drive, a compact disk drive, a compact disk drive, a program cartridge and cartridge interface (such as that found in video game devices), a removable memory chip (such as EPROM, or PROM), etc. which is read by and written to by a removable storage unit 616. Removable storage unit 616, also called a program storage device or a computer program product, represents a floppy disk, magnetic tape, compact disk, etc. As will be appreciated, the removable storage unit 616 includes a computer usable storage medium having stored therein computer software and/or data. The removable storage drive 614 reads from and/or writes to a removable storage unit 616 in a well known manner.

The computer system 602 may also include other similar means for allowing computer programs or other instructions to be loaded. Such means can include, for example, a communications interface 618. Communications interface 618 allows software and data to be transferred between computer system 602 and external devices. Examples of communications interface 618 can include a modem, a network interface (such as an Ethernet card), a communications port, etc. Software and data transferred via communications interface 618 are in the form of signals which can be electronic, electromagnetic, optical or other signals capable of being received by communications interface 618.

In this document, the term "computer program product" is used to generally refer to removable storage unit 616, a hard disk installed in hard disk drive 612, and signals transferred via communications interface 618. These computer program products are means for providing software to a computer system 602.

In an embodiment where the invention is implemented using software, the software may be stored in main memory 608, or in a computer program product and loaded into computer system 602 using removable storage drive 614, hard disk drive 612, or communications interface 618. The software, when executed by the processor 604, causes the processor 604 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is directed to execute on a variety of computer systems 602. The preferred embodiment of an operator console 108 is a Compact personal computer having an Intel 80486 processor 604 and an Ethernet card. The preferred embodiment of a primary coupon management system (PCMS) 118 and a secondary coupon management system (SCMS) 122 is a RS-6000 database server, model R-24, as available from International Business Machines (IBM) Corporation. The operator console 108 is connected to the PCMS 118 and the SCMS 122 by a local area network (LAN). The preferred embodiment of a data distribution system (DDS) 132 is an IBM mainframe computer.

The preferred embodiment of the present invention is implemented in software. More specifically, the software executing on an operator console 108 is a DOS program written in the programming language C. The software executing on a PCMS 118 and a SCMS 122 is an AIX program written in the programming language C that uses the database management system CTree. The software executing on a DDS 132 is written in COBOL and uses the database management system DB2. C, COBOL, CTree, and DB2 are all well known programming languages and database management systems that are described in many publicly available documents.

It should be understood that the preferred embodiment of the present invention is described in these terms for convenience purpose only. Other comparable computer systems 602, processors 604, and programming languages could alternatively be used.

3. Processing at an Operator Console

Figure 7:
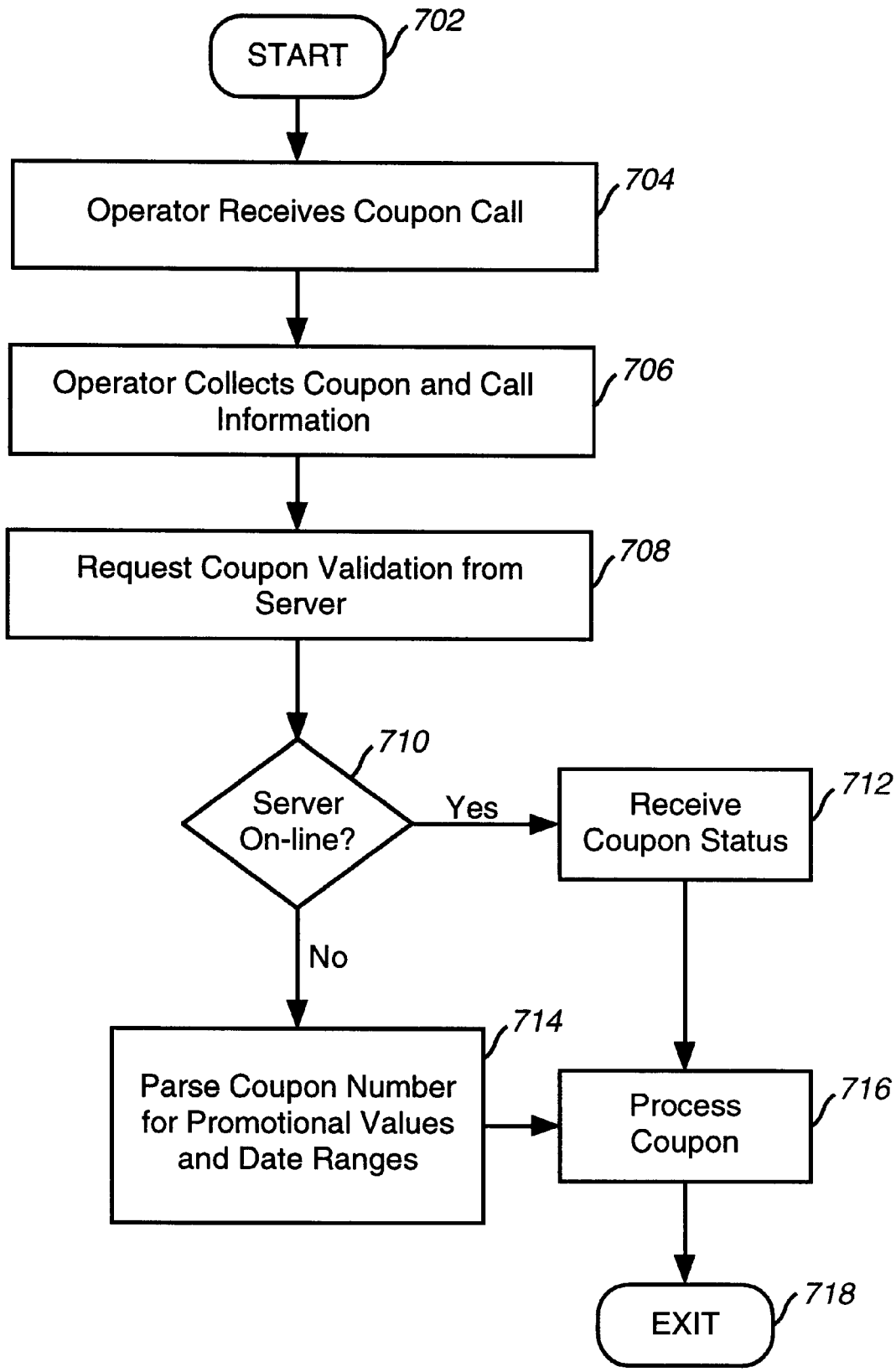
FIG. 7 is a control flow diagram representing the operation of an operator at an operator console.

FIG. 7 is a control flow diagram representing an overview of the operation of the preferred embodiment of an electronic coupon management system at an operator console 108. Processing begins at step 702 and immediately proceeds to step 704. In step 704, an operator receives a coupon call; that is, the operator receives a call from a customer 102 for which the customer 102 wants to use an issued promotional coupon. Continuing to step 706, the operator collects coupon and call information from the customer 102 to assist in the processing of the coupon and the call.

Continuing to step 708, the operator console 108 formulates a coupon validation request to a server. More specifically, the operator console 108 sends a request message via the console application software 202 from the operator console 108 to either the primary coupon management server (PCMS) 118 or the secondary coupon management server (SCMS) 122. The console application software 202 of the operator console 108 uses a resident network information distributed services (NIDS) configuration table to determine which server to access. The request message contains coupon and call information that the server needs to validate the use of the coupon.

Continuing to step 710, the operator console 108 determines whether the PCMS 118, and if needed, the SCMS 122 are on-line and available to service the request message. If the operator console 108 determines that the servers are on-line, the operator console 108 proceeds to step 712.

In step 712, the operator receives a coupon status 112, 114 on the coupon from the server handling the coupon validation request. The coupon status 112, 114 indicates to the operator whether the coupon is available for the customer 102 to use. The operator console 108 then continues to step 716 which is described in greater detail below.

Referring again to step 710, if the operator console 108 determines that the servers are not on-line, the operator console 108 proceeds to step 714. In step 714, the operator console 108 parses the coupon number for promotional values and date ranges to determine a coupon status. The operator console 108 then continues to step 716.

In step 716, the coupon is processed according to its current status. Step 716 is described in greater detail below. Processing then continues to step 718 at which processing terminates and exits the system.

Figure 8:
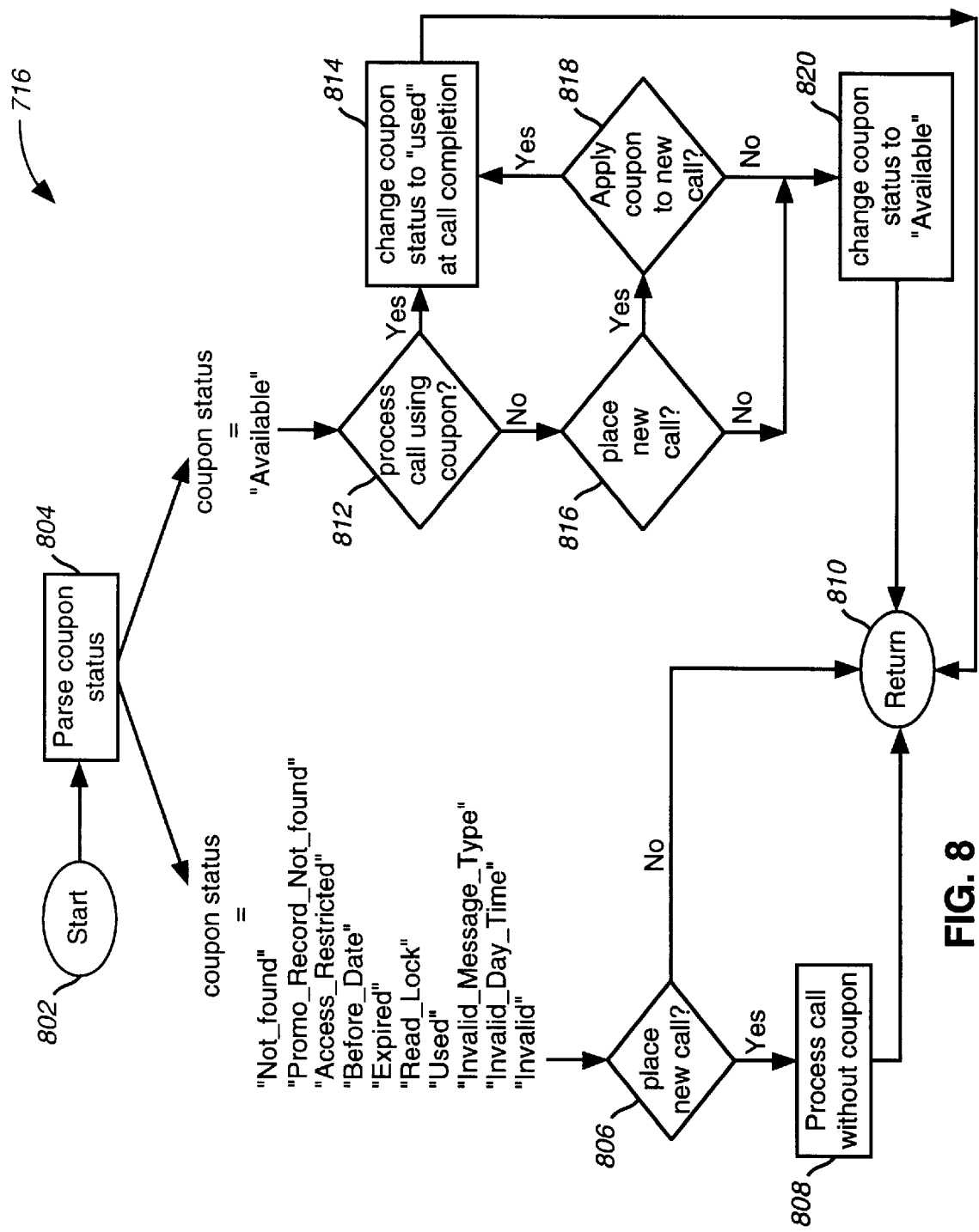
FIG. 8 is a control flow diagram representing the operation of processing a coupon at the operator console.

FIG. 8 is a control flow diagram representing the operation of step 716 in which the console application software 202 of an operator console 108 processes a coupon. Processing begins at step 802 and immediately proceeds to step 804. In step 804, the console application software 202 parses the coupon status 112, 114 received from a server. If the coupon status 112,114 is Not_Found, Promo_Record_Not_Found, Access_Restricted, Before_Date, Expired, Read_Lock, Used, Invalid_Message_Type, Invalid_Day_Time, or Invalid, processing proceeds to step 806. Upon reaching step 806 in the processing, the coupon status 112, 114 indicates that the customer 102 cannot use the current coupon. The coupon status 112, 114 is described in greater detail below. In step 806, the console application software 202 determines whether the customer 102 wants to place a new call and abandon the current call. If the customer 102 does not want to place a new call, the console application software 202 proceeds to step 810. In step 810, the console application software 202 terminates all processing of the current coupon and returns processing back to step 712.

Referring again to step 806, if the customer 102 wants to place a new call, the console application software 202 proceeds to step 808. In step 808, the console application software 202 processes the customer's 102 current call without the coupon. Continuing to step 810, the console application software 202 completes the current call without the promotional discount and returns processing back to step 712.

Referring again to step 804, if the operator console 108 determines that the coupon status 112, 114 is Available, processing proceeds to step 812. Upon reaching step 812 in the processing, the coupon status 112, 114 indicates that the customer 102 can use the current coupon. The coupon status 112, 114 is described in greater detail below. In step 812, the console application software 202 of the operator console 108 determines whether the current call is to be processed using the given coupon. If the customer 102 wants to use the current coupon for the current call, processing proceeds to step 814.

In step 814, the console application software 202 changes the coupon status to "Used." More specifically, the console application software 202 sends a change message to the server to which it is connected. The change message contains the information needed by the server to change the coupon's status to "Used." Continuing to step 810, the console application software 202 terminates all processing of the current call and returns processing back to step 712.

Referring again to step 812, if the customer 102 decides not to use the current coupon for the current call, processing proceeds to step 816. In step 816, the console application software 202 determines whether the customer 102 wants to place a new call or continue with the current call. If the customer 102 decides not to place a new call, the console application software 202 proceeds to step 820. Step 820 is described in greater detail below.

Referring again to step 816, if the customer 102 decides to place a new call, the console application software 202 proceeds to step 818. In step 818, the console application software 202 determines whether the customer 102 wants to apply the coupon to the new call. If the customer 102 wants to apply the coupon to the new call, the console application software 202 proceeds to step 814. Step 814 is described in greater detail above.

Referring again to step 818, if the console application software determines that the customer 102 does not want to apply the coupon to the new call, the console application software 202 proceeds to step 820.

In step 820, the console application software 202 changes the coupon status to "Available". More specifically, the console application software 202 sends a change message to the server to which it is connected. The change message contains the information needed by the server to change the coupon's status to "Available." Continuing to step 810, the console application software 202 terminates all processing of the current call and returns processing back to step 712.

4. Processing at a Coupon Management Server

Figure 9:
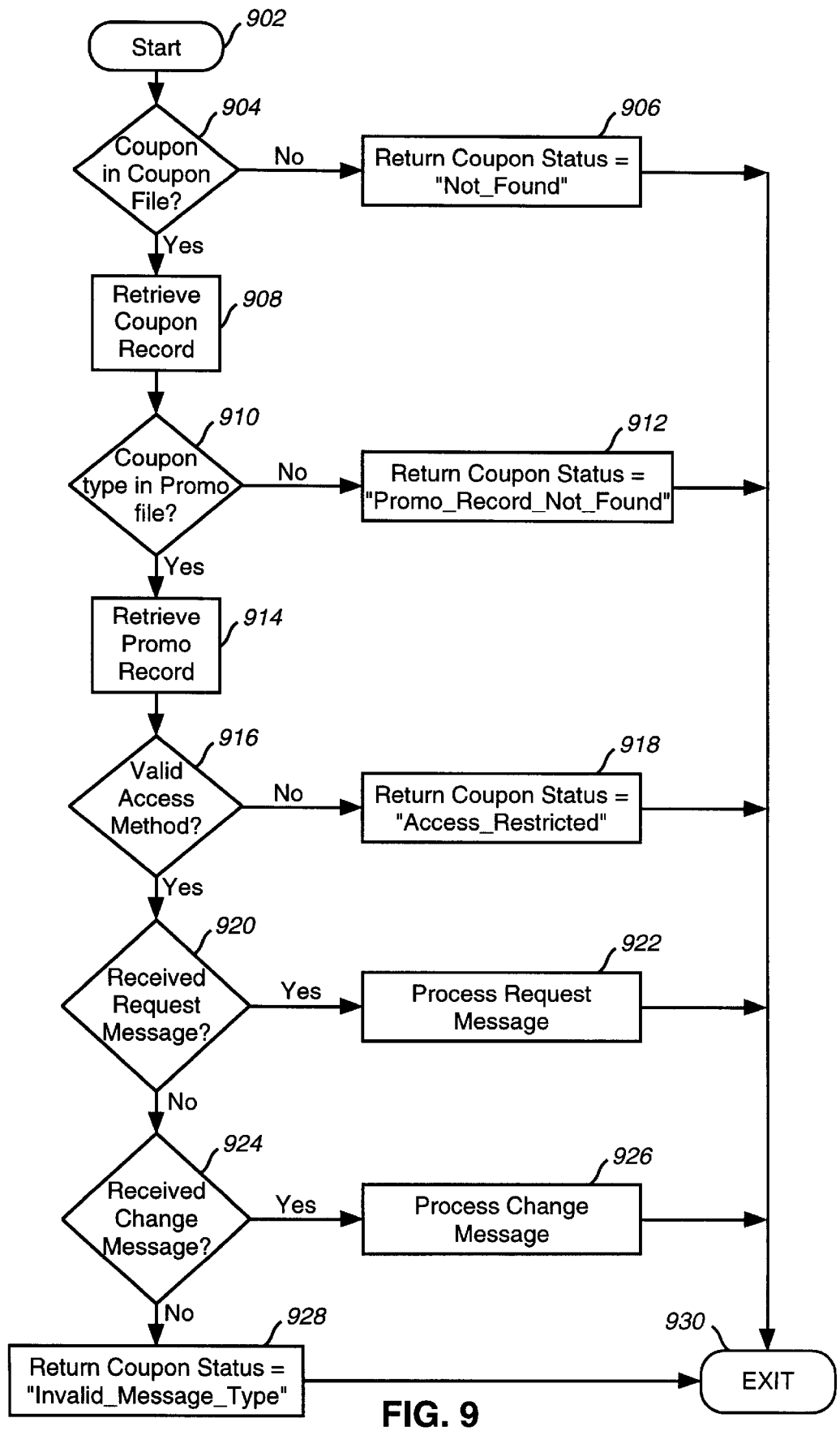
FIG. 9 is a control flow diagram representing the operation of a coupon management server.

FIG. 9 is a control flow diagram representing an overview of the operation of the preferred embodiment of a primary coupon management server (PCMS) 118 or a secondary coupon management server (SCMS) 132. The control flow of the PCMS 118 and SCMS 132 is described in terms of the PCMS 118 for convenience purposes only. It should be understood that the control flow described for the PCMS 118 applies equally to the SCMS 132.

Processing begins at step 902 when the server receives a request or change message 110 and immediately proceeds to step 904. In step 904, the message receiver 302 determines whether the coupon specified in the received message is in the coupon file 322a–322n. If the coupon is not in the coupon file 322a–322n, the message receiver 302 proceeds to step 906. In step 906, the message receiver 302 returns the coupon status 112 of "Not_Found" indicating that the specified coupon was not found in the coupon file 322a–322n. Processing continues to step 930 at which processing terminates and exits the system.

Referring again to step 904, if the message receiver 302 determines that the coupon specified in the received message is in the coupon file 322a–322n, the message receiver 302 proceeds to step 908. In step 908, the message receiver 302 retrieves the coupon record from the coupon file 322a–322n that corresponds to the coupon specified in the received message. Continuing to step 910, the message receiver 302 determines whether the coupon type is in the promo file 320. If the coupon type is not in the promo file 320, the console application software 302 proceeds to step 912. In step 912, the message receiver 302 returns the coupon status 112 of "Promo_Record_Not_Found" indicating that the specified coupon type was not found in the promo file 320. Processing continues to step 930 at which processing terminates and exits the system.

Referring again to step 910, if the message receiver 302 determines that the coupon type is in the promo file 320, the message receiver 302 proceeds to step 914. In step 914, the message receiver 302 retrieves the promo record from the promo file 320 that corresponds to the coupon type. Continuing to step 916, the message receiver 302 determines whether the customer 102 is attempting to use the specified coupon for a telephone call via a valid access method. If the access method for the telephone call is invalid, the message receiver 302 proceeds to step 918. In step 918, the message receiver 302 returns the coupon status 112 of "Access_Restricted" indicating that the customer 102 is attempting to use the specified coupon for a telephone call with an invalid access method. Processing continues to step 930 at which processing terminates and exits the system.

Referring again to step 916, if the message receiver 302 determines that the access method is valid for the telephone call, the message receiver 302 proceeds to step 920. In step 920, the message receiver 302 determines whether it received a request message from the operator console 108. If the message receiver 302 received a request message, the message receiver 302 proceeds to step 922. In step 922, the message receiver 302 processes the request message. Step 922 is described in greater detail below. Processing continues to step 930 at which processing terminates and exits the system.

Referring again to step 920, if the message receiver 302 determines that it did not receive a request message from the operator console 108, the message receiver proceeds to step 924. In step 924, the message receiver 302 determines whether it received a change message from the operator console 108. If the message receiver 302 received a change message, the message receiver 302 proceeds to step 926. In step 926, the message receiver 302 processes the change message. Step 926 is described in greater detail below. Processing continues to step 930 at which processing terminates and exits the system.

Referring again to step 924, if the message receiver 302 determines that it did not receive a change message, the message receiver 302 proceeds to step 928. In step 928, the message receiver returns the coupon status 112 of "Invalid_Message_Type" indicating that it had received an unexpected message. Processing continues to step 930 at which processing terminates and exits the system.

Figure 10:
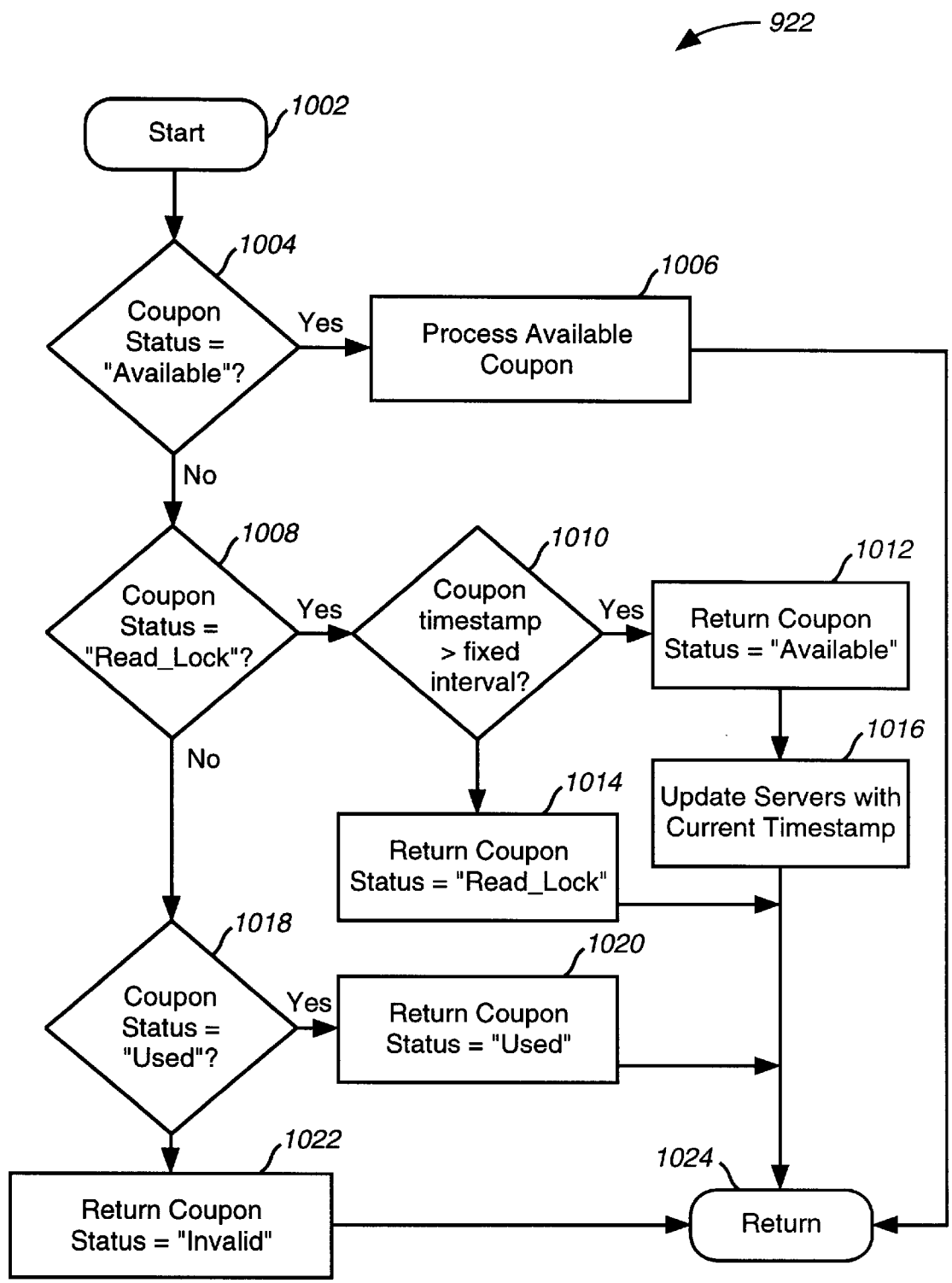
FIG. 10 is a control flow diagram representing the operation of processing a request message.

FIG. 10 is a control flow diagram of step 922 for a server processing a request message from the operator console 108. Processing begins at step 1002 and immediately proceeds to step 1004. In step 1004, the message receiver 302 determines whether the coupon status of the coupon specified in the request message is "Available." If the coupon status is "Available," the message receiver 302 proceeds to step 1006. In step 1006, the message receiver 302 processes the "Available" coupon. Step 1006 is described in greater detail below. Continuing to step 1024, the processing of the request message terminates and control is returned to step 922 in FIG. 9.

Referring again to step 1004, if the message receiver 302 determines that the coupon status is not "Available," the message receiver 302 proceeds to step 1008. In step 1008, the message receiver 302 determines whether the coupon status is "Read_Lock." A "Read_Lock" status indicates that the specified coupon is currently in use. Therefore, a second customer 102 is locked out from using the coupon unless the coupon remains in the "Read_Lock" state for an extended period of time or returns to an "Available" state. If the coupon status is "Read_Lock," the message receiver 302 proceeds to step 1010. In step 1010, the message receiver 302 determines whether the timestamp of the coupon is greater than a fixed interval. If the timestamp is greater than a fixed interval, this indicates that the coupon has been in the "Read_Lock" state for an extended period of time. Processing continues to step 1012 in which the message receiver 302 returns the coupon status 112 of "Available."

Continuing to step 1016, the message receiver 302 updates both servers, the PCMS 118 and the SCMS 122, with a current timestamp. More specifically, the message receiver 302 of the PCMS 118 sends a transaction record 304 to the synchronizer 306. The synchronizer 306 then sends synchronization information and a transaction record 120 to the SCMS 122 to ensure that the SCMS 122 coupon file 422a–422n is updated with the correct timestamp for the specified coupon. Processing continues to step 1024 in which the processing of the request message terminates and control is returned to step 922 in FIG. 9.

Referring again to step 1010, if the message receiver 302 determines that the coupon timestamp is not greater than a fixed interval, the message receiver 302 proceeds to step 1014. In step 1014, the message receiver 302 returns the coupon status 112 of "Read_Lock" indicating that the coupon is currently in use by another customer 102. Therefore, the coupon cannot be used at this time. Processing continues to step 1024 in which the processing of the request message terminates and control is returned to step 922 in FIG. 9.

Referring again to step 1008, if the message receiver 302 determines that the coupon status is not "Read_Lock," the message receiver 302 proceeds to step 1018. In step 1018, the console application software 302 determines whether the coupon status is "Used." If the coupon status is "Used," the message receiver 302 proceeds to step 1020. In step 1020, the message receiver 302 returns the coupon status 112 of "Used" indicating that the coupon has been used and the customer 102 cannot use the coupon for the telephone call. Processing continues to step 1024 in which the processing of the request message terminates and control is returned to step 922 in FIG. 9.

Referring again to step 1018, if the message receiver 302 determines that the coupon status is not "Used," the message receiver 302 proceeds to step 1022. In step 1022, the message receiver 302 returns the coupon status 112 of "Invalid" indicating that the coupon is invalid for the telephone call. Therefore, the customer 102 cannot use the coupon for the telephone call. Processing continues to step 1024 in which the processing of the request message terminates and control is returned to step 922 in FIG. 9.

Figure 11:
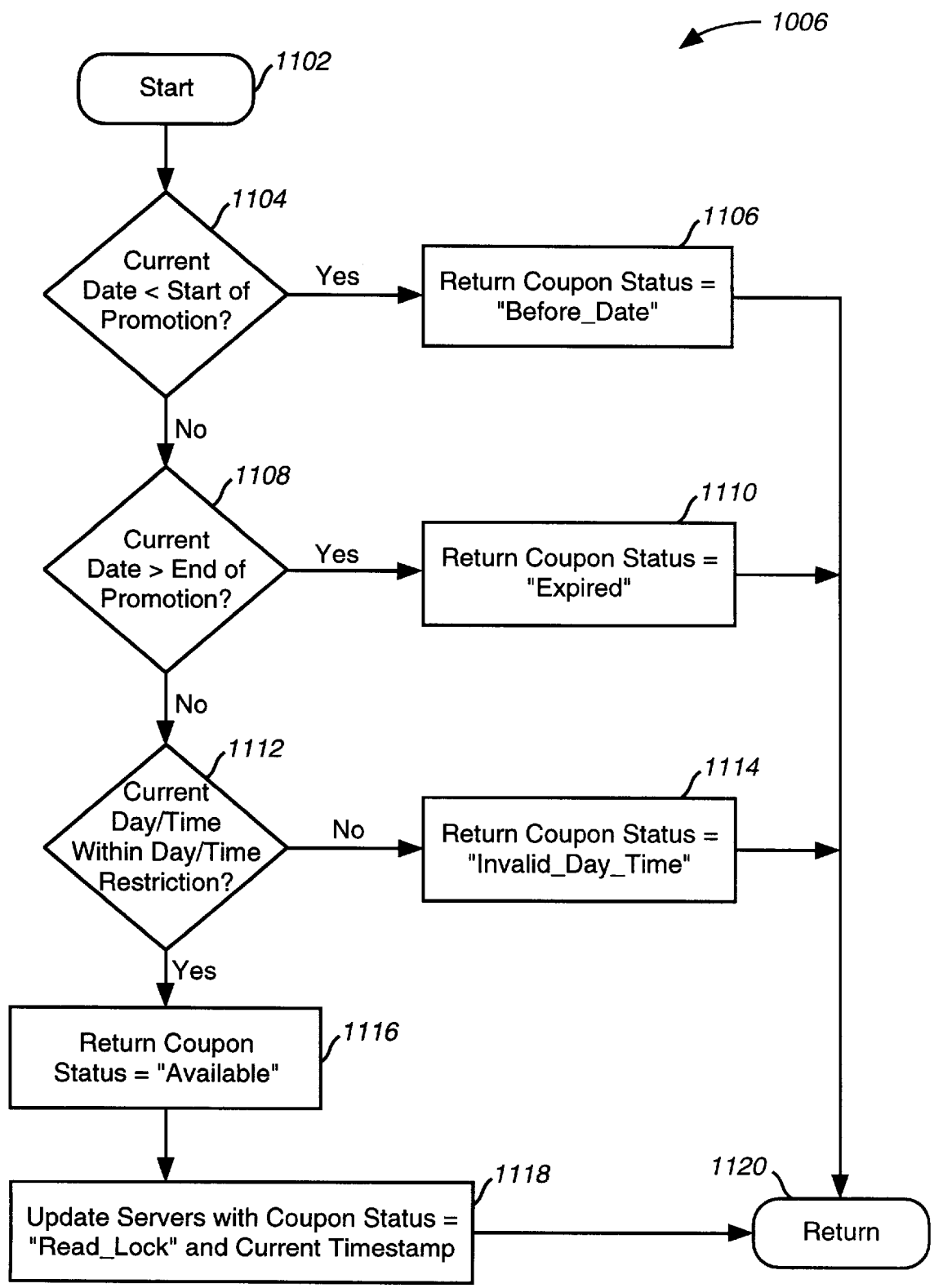
FIG. 11 is a control flow diagram representing the operation of processing an Available coupon.

FIG. 11 is a control flow diagram of step 1006 for a server processing an "Available" coupon. Processing begins at step 1102 and immediately proceeds to step 1104. In step 1104, the message receiver 302 determines whether the current date is prior to the start of the promotion for which the coupon was issued. If the current date is before the start date of the promotion, the message receiver 302 proceeds to step 1106. In step 1106, the message receiver 302 returns the coupon status 112 of "Before_Date" indicating that the customer 102 is attempting to use the coupon before the promotional start date. Processing continues to step 1120 in which the processing of the "Available" coupon terminates and control is returned to step 1006 in FIG. 10.

Referring again to step 1104, if the message receiver 302 determines that the current date is not before the promotional start date, the message receiver 302 proceeds to step 1108. In step 1108, the message receiver 302 determines whether the current date is after the end date of the promotion for which the coupon was issued. If the current date is after the end date of the promotion, the message receiever 302 proceeds to step 1110. In step 1110, the message receiver 302 returns the coupon status 112 of "Expired" indicating that the customer 102 is attempting to use the coupon after the promotion is over. Processing continues to step 1120 in which the processing of the "Available" coupon terminates and control is returned to step 1006 in FIG. 10.

In an alternate embodiment, the end date of a promotion, as used in step 1104, may be an actual end date plus a grace period. This embodiment provides a customer 102 with an extra period of time during which the coupon is still valid. It would be readily apparent to one skilled in the art to add a grace period to an actual end date of a promotion.

Referring again to step 1108, if the message receiver 302 determines that the current date is not after the promotional end date, the message receiver 302 proceeds to step 1112. In step 1112, the message receiver 302 determines whether the current day and time is within a day and time restriction of the promotion for which the coupon was issued. A day and time restriction limits a coupon in that a customer 102 can only use the coupon on a specific day and at a specific time. If the current day and time is not within the day and time restriction of the promotion, the message receiever 302 proceeds to step 1114. In step 1114, the message receiver 302 returns the coupon status 112 of "Invalid_Day_Time" indicating that the customer 102 is attempting to use the coupon outside of the day and time restriction of the promotion. Processing continues to step 1120 in which the processing of the "Available" coupon terminates and control is returned to step 1006 in FIG. 10.

Referring again to step 1112, if the message receiver 302 determines that the current day and time is within the day and time restriction of the promotion, the message receiver 302 proceeds to step 1116. In step 1116, the message receiver 302 returns the coupon status 112 of "Available" indicating that the coupon can be used for the telephone call.

Continuing to step 1118, the message receiver 302 updates both servers, the PCMS 118 and the SCMS 122, with a coupon status of "Read_Lock" and a current timestamp. The "Read_Lock" status will lock out other customers 102 from attempting to use the coupon while the current customer 102 completes the telephone call and uses the coupon. The timestamp resets the lock out period such that after a fixed time interval, the coupon status will revert back to an "Available" status. More specifically, the message receiver 302 of the PCMS 118 sends a transaction record 304 to the synchronizer 306. The synchronizer 306 then sends synchronization information and the transaction record 120 to the SCMS 122 to ensure that the SCMS 122 coupon file 422a–422n is updated with a new coupon status and a current timestamp for the specified coupon. Processing continues to step 1120 in which the processing of the "Available" coupon terminates and control is returned to step 1006 in FIG. 10.

Figure 12:
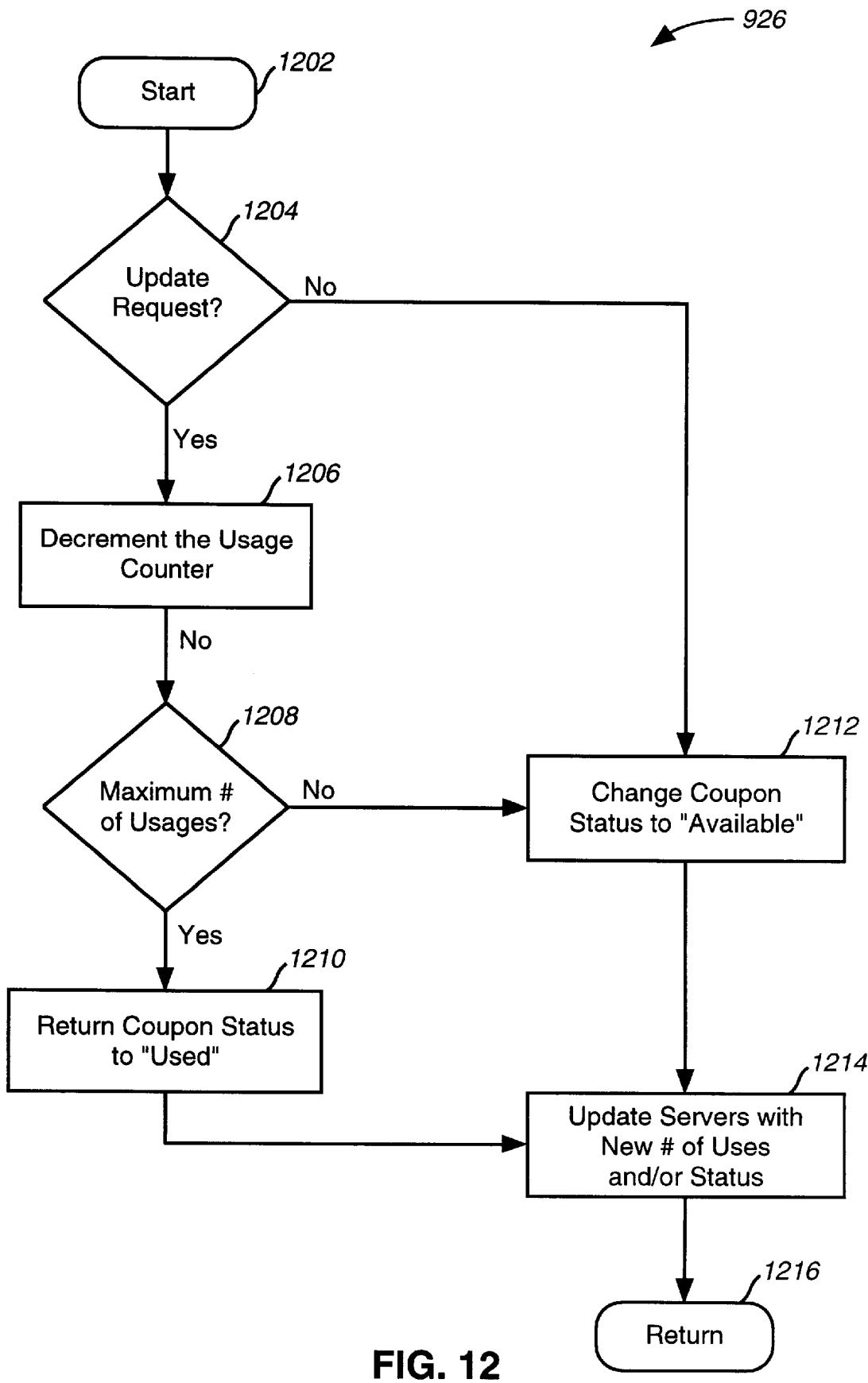
FIG. 12 is a control flow diagram representing the operation of processing a change message.

FIG. 12 is a control flow diagram of step 926 for a server processing a change message from the operator console 108. Processing begins at step 1202 and immediately proceeds to step 1204. In step 1204, the message receiver 302 determines whether the change message requests an update to the usage counter associated with a specific coupon or requests an unlocking of a coupon's status 112. The usage counter indicates the number of times that the specified coupon has been used. If the message receiver 302 determines that it is to update a coupon's usage counter, the message receiver 302 proceeds to step 1206. In step 1206, the message receiver 302 decrements the usage counter of the specified coupon. Continuing to step 1208, the message receiver 302 determines whether the number of times that the specified coupon has been used exceeds a maximum number of uses. If the number of uses does not exceed the maximum number of uses, the message receiver 302 proceeds to step 1212. Step 1212 is described in more detail below.

Referring again to step 1204, if the message receiver 302 determines that it is not to update the usage counter of the specified coupon, but is to unlock the coupon for another use, the message receiver 302 proceeds to step 1212.

In step 1212, the message receiver 302 changes the coupon status 112 to "Available" indicating that the coupon can be used for another promotional discount. Continuing to step 1214, the message receiver 302 updates both servers, the PCMS 118 and the SCMS 122. More specifically, the message receiver 302 of the PCMS 118 sends a transaction record 304 to the synchronizer 306 including the new number of times that the coupon has been used for the promotional discount and the new coupon status 112. The synchronizer 306 sends synchronization information and the transaction record 120 to the SCMS 122 to ensure that the SCMS 122 coupon file 422a–422n is updated with the new number of uses and the coupon status 112 for the specified coupon. Processing continues to step 1216 in which the processing of the change message terminates and control is returned to step 926 in FIG. 9.

Referring again to step 1208, if the message receiver 302 determines that the number of times that the specified coupon has been used exceeds a maximum number of uses, the message receiver 302 proceeds to step 1210. In step 1210, the message receiver 302 changes the coupon status 112 to "Used" indicating that the coupon cannot be used for any more promotional discounts because it has been used a maximum number of times. After changing the coupon status 112, the message receiver 302 continues to step 1214. Step 1214 was described in detail above.

5. Alternative Embodiments of the Present Invention

The preferred embodiment of the present invention is described in terms of printed coupons used for long distant telephony for convenience purposes only. More specifically, a customer 102 uses a coupon to make a telephone call over the public telephone network by calling an operator at an operator console 108. It should be understood, however, that the present invention is equally applicable to alternate embodiments.

One alternate embodiment comprises the issuing of coupons to customers 102 electronically. For example, a service provider may provide a coupon number to a customer 102 over a telephone line via voice or a computer modem. Similarly, a customer 102 may provide the coupon number to an operator over a telephone line via a computer modem or by entering the coupon number as a dual tone multi-frequency (DTMF) sequence from a touch-tone telephone. It would be readily apparent to one skilled in the art to adapt the present invention to these alternate embodiments.

A further embodiment comprises the electronic redemption of coupons for alternate telecommunication goods and services. Telecommunication goods and services include, but are not limited to, long distance telephony, computer access, internet access, wide world web access, etc. It would be readily apparent to one skilled in the art to apply the present invention to these alternate telecommunication goods and services.

A still further embodiment comprises the elimination of the need for an operator. The use of an actual human operator to communicate with a customer is for convenience purpose only. It would be readily apparent to one skilled in the relevant art to automate the communication between a customer and an operator console 108 of the present invention.

Conclusion

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A coupon management system for remotely managing and redeeming a promotional coupon comprising:

an operator console for receiving a telephonic request from a customer to redeem the promotional coupon, wherein said telephonic request includes a unique coupon number that is printed on the promotional coupon; and a primary database server, comprising:
one or more coupon files, each of said coupon files including one or more coupon records, each of said coupon records comprising a stored coupon number and a stored status code associated with a particular issued coupon;

a message receiver for receiving request and change messages from said operator console and for returning a coupon status to said operator console; and a coupon status means for retrieving a matched coupon record corresponding to the promotional coupon, wherein said stored status code in said matched coupon record matches said unique coupon number from said telephonic request and for returning to said operator console said coupon status that indicates the promotional coupon is available if said coupon status means determines:
said matched coupon record indicates an available status; and
a current day and time is within a day and time restriction of the promotional coupon.

2. The coupon management system according to claim 1, wherein said operator console is connected to said primary database server via a local area network.

3. The coupon management system according to claim 1, further comprising:
a promo file having one or more promotional records, each promotional record representing a type of promotional coupon issued to a customer and including one or more promotional characteristics describing when a promotional coupon is valid;
a promotional record means for requesting from said promo file a promotional record corresponding to the promotional coupon, wherein a type of promotional coupon included in said promotional record equals a type of the promotional coupon, and for retrieving said day and time restriction of the promotional coupon from said promotional record; and
a download handler for receiving promo and coupon tables and loading said promo and coupon tables into said coupon files and said promo file.

4. The coupon management system according to claim 1, further comprising:
a secondary database server that is a copy of said primary database server.

5. The coupon management system according to claim 4, comprising:
said primary database server further comprising:
a synchronizer for sending and receiving synchronization information and transaction records to and from said secondary database server; and
said secondary database server further comprising:
a synchronizer for sending and receiving synchronization information and transaction records to and from said primary database server.

6. The coupon management system according to claim 4, wherein said primary database server is connected to said secondary database server via a local area network.

7. A method for remotely redeeming a promotional coupon using a telephone, comprising the steps of:
creating a plurality of coupon files within a database, each of said coupon files comprising a plurality of coupon records, each of said coupon records comprising a stored coupon number and a stored status code associated with a particular issued coupon;

issuing the promotional coupon to a customer, the promotional coupon having a unique coupon number printed thereon, said unique coupon number corresponding to one of said coupon records;

receiving, at an operator console, a telephonic request from a customer to redeem the promotional coupon, said telephonic request including said unique coupon number;

retrieving a matched record from said database, wherein said stored coupon number in said matched record matches said unique coupon in said telephonic request;

reading said stored status code from said matched coupon record;

determining whether a current day and time is within a day and time restriction associated with the promotional coupon, if said stored status code indicates an available status;

returning a coupon status indicating the coupon is available to said operator console, if said current day and time is within said day and time restriction of the promotional coupon.

8. The method according to claim 7, further comprising the steps of:

changing said stored status code in said matched record to a read lock status, if said current day and time is within said day and time restriction of the promotional coupon; and changing said stored status code in said matched record to indicate a used condition after said promotional coupon is redeemed by said customer.

9. The method according to claim 7, further comprising the steps of:

determining a maximum number of uses for the promotional coupon, said maximum number of uses representing a maximum number of times that the promotional coupon can be redeemed by said customer;

updating a usage counter after said customer uses the promotional coupon, said usage counter representing a number of times that the promotional coupon has been redeemed;

comparing said usage counter to said maximum number of uses;

changing said stored status code of said matched record to indicate a used condition, if said usage counter exceeds said maximum number of uses; and changing said stored status code of said matched record to indicated an available status, if said usage counter does not exceed said maximum number of uses.

10. The method of claim 7, further comprising the steps of:

establishing a promo file having one or more promotional records, each promotional record representing a type of promotional coupon issued to a customer and including one or more promotional characteristics describing when a promotional coupon is valid;

requesting from said promo file a promotional record corresponding to the promotional coupon, wherein a type of promotional coupon included in said promotional record equals a type of the promotional coupon; and retrieving said day and time restriction of the promotional coupon from said promotional record.

11. The method according to claim 7, further comprising the steps of:

establishing a plurality of secondary coupon files as a backup to said plurality of coupon files; and updating said secondary coupon files each time said coupon files are updated.

12. A coupon management system for remotely managing and redeeming a promotional coupon for goods and services, comprising:

an operator console for receiving a request from a customer to use the promotional coupon including a unique coupon number;

a primary database server located remotely from said operator console, comprising:

one or more coupon files, each coupon file including one or more coupon records, each coupon record corresponding to a promotional coupon issued to a customer and including a unique coupon number for the promotional coupon and a coupon status representing a status of the promotional coupon;

a message receiver for receiving request and change messages from said operator console and for returning a coupon status to said operator console; and a coupon status means for retrieving from a coupon file a coupon record corresponding to the promotional coupon, wherein a unique coupon number included in said coupon record equals said unique coupon number of the promotional coupon, and for returning to said operator console said coupon status of Available if said coupon status means determines:

said coupon status of said coupon record is Available, and a current day and time is within a day and time restriction of the promotional coupon;

a promo file having one or more promotional records, each promotional record representing a type of promotional coupon issued to a customer and including one or more promotional characteristics describing when a promotional coupon is valid;

a promotional record means for requesting from said promo file a promotional record corresponding to the promotional coupon, wherein a type of promotional coupon included in said promotional record equals a type of the promotional coupon, and for retrieving said day and time restriction of the promotional coupon from said promotional record; and a download handler for receiving promo and coupon tables and loading said promo and coupon tables into said coupon files and said promo file.

13. The coupon management system according to claim 12, wherein said operator console is connected to said primary database server via a local area network.

14. The coupon management system according to claim 12, further comprising a secondary database server that is a copy of said primary database server.

15. The coupon management system according to claim 14, wherein said primary database server further comprises:

a synchronizer for sending and receiving synchronization information and transaction records to and from said secondary database server; and said secondary database server further comprises:

a synchronizer for sending and receiving synchronization information and transaction records to and from said primary database server.

16. The coupon management system according to claim 14, wherein said primary database server is connected to said secondary database server via a local area network.

* * * * *